United States Patent [19]

Hiller et al.

[11] Patent Number: 5,973,328
[45] Date of Patent: Oct. 26, 1999

[54] NEUTRON DETECTOR USING SOL-GEL ABSORBER

[75] Inventors: John M. Hiller; Steven A. Wallace, both of Oak Ridge; Sheng Dai, Knoxville, all of Tenn.

[73] Assignee: Lockheed Martin Energy Research Corporation, Oak Ridge, Tenn.

[21] Appl. No.: 08/959,883

[22] Filed: Oct. 29, 1997

[51] Int. Cl.[6] .................................................. G01T 1/20
[52] U.S. Cl. .............................. 250/390.01; 250/361 R; 376/153
[58] Field of Search ................... 250/390.01, 390.03, 250/390.11, 337, 370.05, 361 R; 252/301.4 R; 376/153, 154

[56] References Cited

U.S. PATENT DOCUMENTS

| | | | |
|---|---|---|---|
| 3,222,521 | 12/1965 | Einfeld | 250/83.1 |
| 4,365,159 | 12/1982 | Young | 250/385 |
| 4,481,421 | 11/1984 | Young et al. | 250/390 |
| 5,002,721 | 3/1991 | Bernard et al. | 376/159 |
| 5,216,249 | 6/1993 | Jones et al. | 250/370.05 |
| 5,334,840 | 8/1994 | Newacheck et al. | 250/483.1 |
| 5,336,889 | 8/1994 | Hofstetter | 250/361 R |
| 5,532,482 | 7/1996 | Stephenson | 250/269.4 |
| 5,656,815 | 8/1997 | Juatus et al. | 250/337 |
| 5,659,177 | 8/1997 | Schulte et al. | 250/390.12 |

OTHER PUBLICATIONS

M. Bliss et al., Real–Time Dosimetry for Boron Neutron-–Capture Theraspy, IEEE Trans. Nucl. Sci., 42, 639–43 (1995).

Sheng Dai et al., Spectroscopic Investigation of the Photochemistry of Uranyl–Doped Sol–Gel Glasses Immersed in Ethanol, Inorg. Chem., 35, 7786–90 (1996).

H. Krinninger et al., Pulsed Neutron Method for Non–Destructive and Simultaneous Determination of the $^{235}$U and $^{239}$Pu Contents of Irradiated and Non–Irradiated Reactor Fuel Elements, Nucl. Instr. Meth. 73, 13–33 (1969).

M. Zanarini et al., Evaluation of Hydrogen Content in Metallic Samples by Neutron Computed Tomography, IEEE Trans. Nucl. Sci., 42, 580–84 (1995).

C. M. Logan et al., Observed Penetration of 14–MeV Neutrons in Various Materials, Nucl. Sci. Eng. 115, 38–42 (1993).

H. Jaeger et al., Two–Detector Coincidence Routing Circuit for Personal Computer–Based Multichannel Analyzer, Rev. Sci. Instrum. 66, 3069–70 (1995).

E.J.T. Burns et al., A Solenoidal and Monocusp Ion Source (SAMIS), Rev. Sci. Instr., 67, 1657–60 (1996).

S.T. Coyle et al., A Low Cost Preamplifier for Fast Pulses From Microchannel Plates, Rev. Sci. Instr., 66 4000–01 (1995).

*Primary Examiner*—Edward P. Westin
*Assistant Examiner*—Richard Hanig
*Attorney, Agent, or Firm*—Quarles & Brady

[57] ABSTRACT

An neutron detector composed of fissionable material having ions of lithium, uranium, thorium, plutonium, or neptunium, contained within a glass film fabricated using a sol-gel method combined with a particle detector is disclosed. When the glass film is bombarded with neutrons, the fissionable material emits fission particles and electrons. Prompt emitting activated elements yielding a high energy electron contained within a sol-gel glass film in combination with a particle detector is also disclosed. The emissions resulting from neutron bombardment can then be detected using standard UV and particle detection methods well known in the art, such as microchannel plates, channeltrons, and silicon avalanche photodiodes.

20 Claims, 4 Drawing Sheets

NEUTRON DETECTOR USING SOL-GEL ABSORBER

This invention was made with government support under contracts DE-AC05-96OR22464, awarded by the United States Department of Energy to Lockheed Martin Energy Research Corporation and DE-AC05-84OR21400, awarded by the United States Department of Energy to Lockheed Martin Energy Systems, Inc., and the United States Government has certain rights in this invention.

FIELD OF THE INVENTION

The field of invention is neutron detectors, more particularly neutron detectors with solid absorbers.

BACKGROUND OF THE INVENTION

Neutron detectors are useful in many industries. They are most commonly found in the oil industry to detect potential oil yielding sites. Oil producing formations deep in the earth emit neutrons at a different rate than water bearing formations or non-fluid bearing rock. A device using neutron detection for logging oil wells is disclosed in U.S. Pat. No. 4,641,028 to Taylor et al. issued on Feb. 3, 1987. Neutrons detectors are also useful in the medical field and for surveillance in nuclear facilities and weapons storage.

Neutrons are uncharged particles and do not ionize matter as they pass through it. Therefore, they are difficult to detect directly. Some other evidence of a neutron event must be detected in order to determine its existence. An indirect method detects the result of a neutron event and not the neutron event itself.

The use of indirect detection of neutrons is known in the art. For example, a neutron detector as disclosed in U.S. Pat. No. 5,334,840 to Newacheck et al. issued Aug. 2, 1994 detects photons of light emitted by carbon infiltrated boron nitride in its hexagonal form when the compound is bombarded by neutrons. The amount of light detected correlates to the number of neutrons bombarding the boron nitride.

Another neutron detector commercially available utilizes Helium-3 as the neutron absorber. When bombarded by neutrons, Helium-3 decomposes into H and $H_3$ while emitting electrons with an energy of 764 keV. The ionization of the gas electrons can be detected using conventional methods well known in the art and further described below. This type of neutron detector requires a long collection time for the resulting ionization requiring integrating and differentiating time constants of between 1 and 5 microseconds for the best results.

Other gas mixtures are commercially available that have varying resolution or charge per pulse yields depending on the gases used.

Neutron detection for monitoring the dose of thermal neutrons given patients receiving boron neutron-capture therapy have used lithium-6 and a cerium activator in a glass fiber. See reference 1. The present invention improves upon this technique by allowing a cerium activated glass fiber to be coated with the fissionable elements as described herein. A wet chemistry method of placing radioactive fissile elements into glass which in the vitrified state does not pose a hazard, as described herein using sol-gel based technology, is a significant benefit. Reference 10 describes an avalanche photodiode implementation for detecting neutron induced ionization and optical pulse detection.

The present invention incorporates sol-gel techniques not heretofore used in the art of neutron detection. Sol-gel chemistry was first discovered in the late 1800s. This area of chemistry has received renewed interest when the process was found useful in producing monolithic inorganic gels at low temperatures that could be converted to glasses without a high temperature melting process. A comprehensive explanation of sol-gel chemistry may be found in reference 2. Further detail disclosing uranyl-doped sol-gel glasses is disclosed in reference 3.

Emissions detectors such as microchannel plates, channeltrons, or avalanche photodiodes are in common use for detecting ultraviolet (UV) light and fissioned particles such as electrons. Microchannel plates are commercially available and well known in the art. Typically a microchannel plate is formed from lead glass having a uniform porous structure of millions of tiny holes or microchannels. Each microchannel functions as a channel electron multiplier, relatively independent of adjacent channels. A thin metal electrode is vacuum deposited on both the input and output surfaces to electrically connect channels in parallel. Microchannel plates can be assembled in stacked series to enhance gain and performance.

The microchannel plates serve to amplify emissions from fissionable material resulting from the bombardment of neutrons. The amplified signal which is proportional to the emissions which is in turn proportional to the amount of neutrons bombarding the fissionable material can then be detected and recorded.

Channeltrons operate on the same basic principal of amplifying proportional signals emitted from fissionable materials. A channeltron is a horn-shaped continuous dynode structure that is coated on the inside with an electron emissive material. An ion striking the channeltron creates secondary electrons that have an avalanche effect to create more secondary electrons and finally a current pulse.

Typically due to the exotic materials and sensitivity of the equipment, the neutron detectors currently available are expensive and difficult to maintain. For example Helium-3 is an extremely rare stable isotope and must be separated at considerable expense from the radioactive gas tritium. Furthermore, the use of a gas absorber results in a slower response time than a solid absorber as disclosed herein. The present invention incorporating fissionable material into a sol-gel composition in combination with an emission detector is new to the art and overcomes some the disadvantages of the prior art described herein.

BRIEF SUMMARY OF THE INVENTION

A primary objective of the present invention is to provide a high speed neutron detector. This is accomplished by providing a detector consisting of material that yields a prompt electron, proton, triton or fission fragment when absorbing a neutron is combined with a particle detection member. The material, such as lithium oxide, uranium oxide, thorium oxide, plutonium oxide, and neptunium oxide, contained within a glass film emits particles detectable by standard UV and particle detectors, such as microchannel plates, channeltrons, or other detection methods well known in the art. The glass film containing fissionable material or the like and a detection member are combined to make a useful invention for high speed neutron detection.

The glass film containing fissionable material is fabricated using a sol-gel method that can be deposited on an essentially rigid element such as a stainless steel plate, quartz plate, glass lens, or a glass fiber.

Another objective of the invention is to provide a high speed neutron detector that fluoresces. This is accomplished by incorporating a rare earth element into the detector. Cerium oxide or other rare earth that fluoresces when stimulated by ionization in a glass matrix can be incorporated into the glass film created using a sol-gel method to enhance the UV light emitted when bombarded by neutrons. Alternatively, the rare earth element could be incorporated into a glass essentially rigid element.

Still another objective of the present invention is to provide a high speed neutron detection system that can provide useful information about a test article. This is accomplished by combining the invention with a pulsed neutron source or x-ray machine, the resulting embodiment of the invention can then be used to determine certain characteristics of an article interposed between the pulsed neutron source and the neutron detector.

Additional embodiments and uses of the present invention are described herein.

For further background materials concerning the teachings of which are incorporated herein by reference, reference is made to the following publications.

1. M. Bliss et al., "Real-Time Dosimetry for Boron Neutron-Capture Therapy", IEEE Trans. Nucl. Sci., 42, 639–43 (1995).
2. C. J. Brinker et al., "Sol-Gel Science: The Physics and Chemistry of Sol-Gel Processing" (Academic Press, Inc., New York 1990).
3. Sheng Dai et al., "Spectroscopic Investigation of the Photochemistry of Uranyl-Doped Sol-Gel Glasses Immersed in Ethanol", Inorg. Chem., 35, 7786–90 (1996).
4. H. Krinninger et al., "Pulsed Neutron Method for Non-Destructive and Simultaneous Determination of the $^{235}$U and $^{239}$Pu Contents of Irradiated and Non-Irradiated Reactor Fuel Elements", Nucl. Instr. Meth. 73, 13–33 (1969).
5. M. Zanarini et al., "Evaluation of Hydrogen Content in Metallic Samples by Neutron Computed Tomography", IEEE Trans. Nucl. Sci., 42, 580–84 (1995).
6. C. M. Logan et al., "Observed Penetration of 14-MeV Neutrons in Various Materials", Nucl. Sci. Eng. 115, 38–42 (1993).
7. H. Jaeger et al., "Two-Detector Coincidence Routing Circuit for Personal Computer-Based Multichannel Analyzer", Rev. Sci. Instrum. 66, 3069–70 (1995).
8. E. J. T. Burns et al., "A Solenoidal and Monocusp Ion Source (SAMIS)", Rev. Sci. Instr., 67, 1657–60 (1996).
9. S. T. Coyle et al., "A Low Cost Preamplifier for Fast Pulses From Microchannel Plates", Rev. Sci. Instr., 66, 4000–01 (1995).
10. M. Ghioni et al., "Compact Active Quenching Circuit for Fast Photon Counting with Avalanche Photodiodes", Rev. Sci. Instr., 67, 3440–48 (1996).

DETAILED DESCRIPTION OF THE PREFERRED EMBODIMENTS

Figure 1:
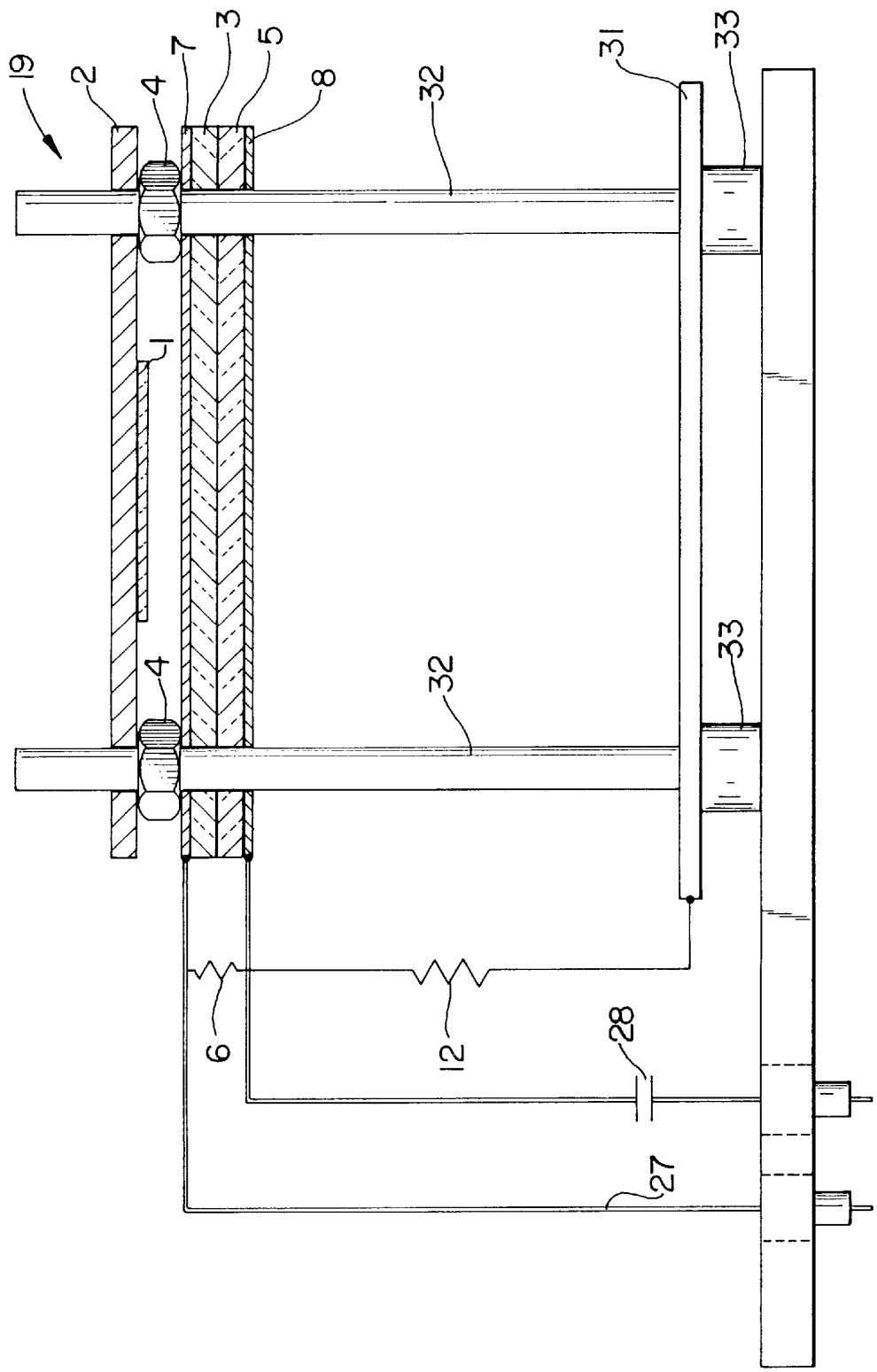
FIG. 1 is an embodiment of the present invention with microchannel plates.

In FIG. 1, neutron detector 19 includes a lithium-6, 95% enrichment, sol-gel glass film 1 deposited onto an essentially rigid element 2, such as a stainless steel, quartz, or silica plate, or glass fiber in combination with a pair of microchannel plates, 3 and 5. The glass film 1 is positioned facing a microchannel plate input surface 7 of microchannel plate 3. A second microchannel plate 5 is stacked in series with microchannel plate 3. A microchannel plate output surface 8 is deposited on the surface of microchannel plate 5 that is facing away from microchannel plate 3. An insulating nut spacer 4 provides a separation distance between lithiated glass film 1 and microchannel plate input surface 7.

A vacuum exists between lithiated glass 1 and input surface 7. The vacuum of approximately $10^{-6}$ Torr evacuates gases that may impede the fissile emissions and slow down the response time of the detector. In addition, the high vacuum is necessary to prevent burn-up of the microchannel plates, 3 and 5.

Figure 2:
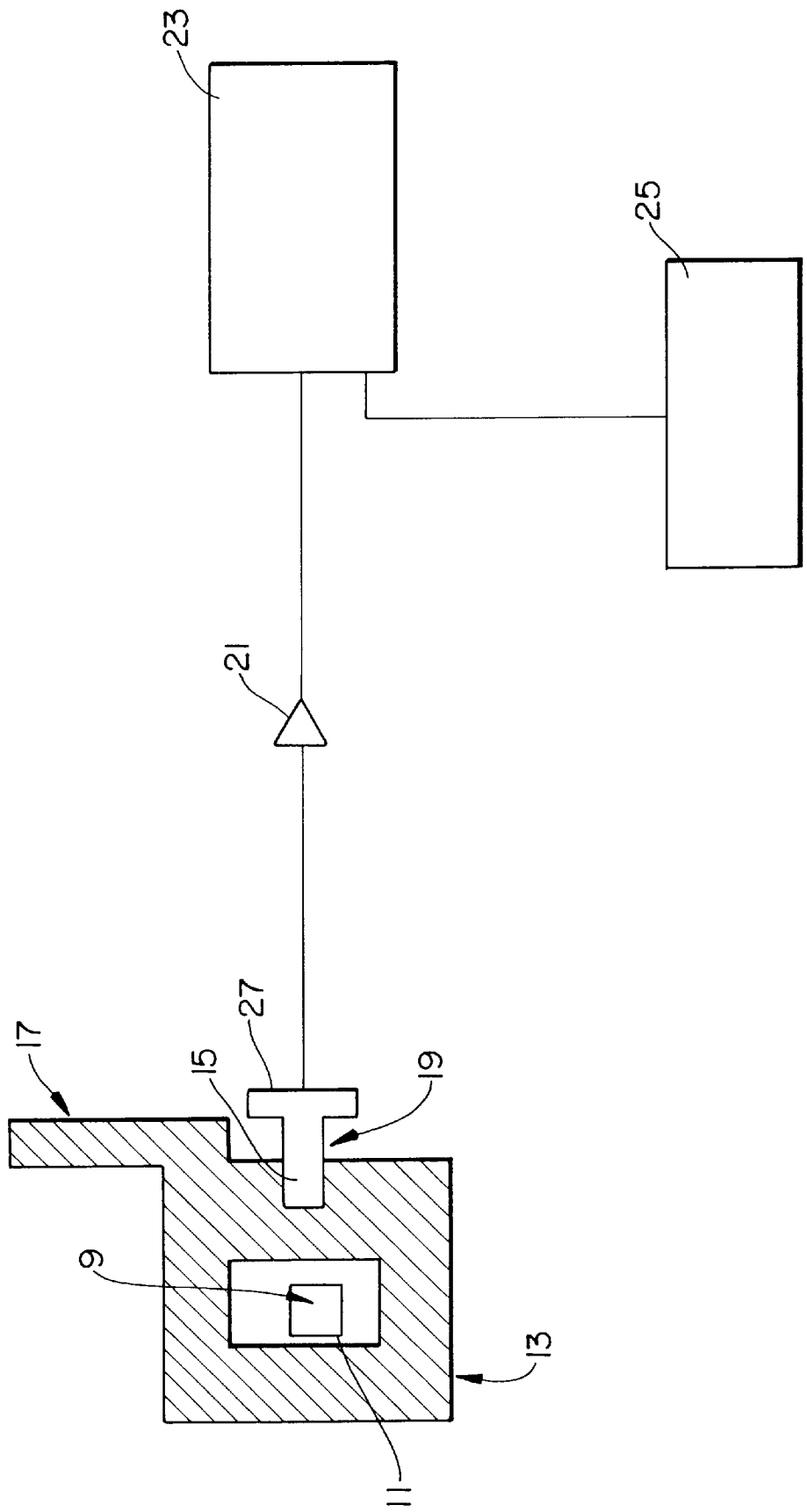
FIG. 2 is a diagram of a test setup for the present invention.

In the embodiment shown in FIGS. 1 and 2, a −2250 VDC power supply 27 is electrically connected to microchannel input surface 7. A 470 pf, 3 kv capacitor 28 is electrically connected to microchannel plate output surface 8 in series with a high speed amplifier 21. Surfaces 7 and 8 are biased with a resistor string 6 so that microchannel plate input surface 7 is at a −2050 volt potential with respect to ground. Amplifier 21 amplifies an output electrical pulse going to ground through resistor 12 and is electrically connected to a commercially available signal counter 23 for counting and recording the signals generated by detector 19.

In an embodiment, as shown in FIG. 1, the embodiment components are insulated from ground and held in position by insulating threaded rods 32. An anode 31 provides a common ground at the base of insulated threaded rods 32 for the amplified electron flux generated by microchannel plates, 3 and 5 and the output signal at plate output surface 8. The entire apparatus is mounted on electrical standoffs 33 which provide a path to electrical ground.

The sol-gel absorber 1 in the embodiment of the invention shown in FIG. 1 using lithium is created by mixing a sol-gel precursor, tetramethyl-orthosilicate $Si(OCH_3)_4$, with lithium-6 deuteroxide, available from Isotec, Inc., Miamisburg, Ohio, product No. 81-700-27-O, in water. In this embodiment, 0.1004 g of lithium-6 deuteroxide is mixed with 2.6057 g of $H_2O$ and 2.6 g of the sol-gel precursor disclosed above. The resulting sol-gel mixture is deposited as a film 1 on a stainless steel plate 2. The final sol-gel film mixture is then cured at room temperature to form a solid glass film on plate 2. Other curing processes and sol-gel precursors known in the art may be used.

Instead of lithium, other materials such as uranium, thorium, plutonium, or neptunium oxides can be included into glass films using the sol-gel process. Oxides are metal compounds in a convenient form that contain the fissionable element. The glass absorber, however, can be doped with ions of these elements in any compound that does not interfere with the sol-gel process.

Glass doped with fissile material such as Li-6, U-235, Np-237, Pu-239 and others will yield prompt ionized fission fragments when they absorb a neutron. A fission fragment or electron is prompt if the electron or fragment is emitted in less than 1 nanosecond of the neutron absorption. Each of these metallic elements can be made to fission upon bombardment by neutrons of an energy particularized to the isotope of interest. For example, the odd isotopes U-235 and Pu-239 scavenge thermal neutrons with fissioning occurring and cause the production of more neutrons thereby allowing chain reactions to occur. The even isotopes U-234, U-236, U-238, Th-232, Pu-238, and Pu-240 have a threshold response such that only fast neutrons fission these nuclei.

Other elements that may or may not fission can be used in the present invention, as long as a prompt electron, proton, triton, or fission fragment is emitted when struck by a neutron. By having a system with combinations of detectors having different sensitivities, information is obtained as to the energy distribution of neutrons passing through an object.

The embodiment shown in FIG. 1 discloses two microchannel plates stacked in series. Stacking additional microchannel plates could be used. A single microchannel plate could also be used in combination with an appropriate amplifier.

A test setup for determining the sensitivity and response time of an embodiment of the present invention is shown in FIG. 2. A neutron source 9, as shown in FIG. 2, is an intimate mixture of Americium-241 and natural lithium and is contained within a welded sealed tungsten cylinder 11. Neutron source 9 is placed into a source chamber 13 constructed from a cadmium lined steel box with a polyethylene coated interior. Source chamber 13 has a cavity 15 covered by door 17 that when opened allows the detection of neutrons by a detector.

In neutron source 9, about one alpha particle in one million emitted from the Americium interacts with a nearby lithium atom to yield a fast neutron. The polyethylene hydrogen atoms in source chamber 13 are impacted by the fast neutrons and momentum is exchanged with the neutrons giving energy to the hydrogen atoms. When the bouncing of the neutrons has occurred several times, the neutrons come into equilibrium with the motion of the hydrogen atoms which are moving with an energy determined by the temperature of the polyethylene. This condition of equilibration is known as thermalization. At the condition of equilibrium, the neutrons are moving on average at about 2200 meters per second.

Lithium-6 has a high probability of absorbing a neutron moving 2200 m/s compared with the hydrogen in the polyethylene. When detector 19, as illustrated in FIGS. 1 and 2, is placed into cavity 15 of source chamber 13, a neutron fluence of about 100 $n/cm^2/sec$ passes through detector 19 components.

Those neutrons passing through the lithiated glass 1 are captured by the lithium-6 and become part of the lithium-6 nucleus. Within a very short time, less than a nanosecond, the lithium-6 nucleus fissions into two particles moving very rapidly away from each other. A few of the particle pairs will be moving exactly in the plane of glass 1, but the majority will have one particle going into the steel plate 2 and the other going the short distance through the vacuum to the microchannel plate input surface 7.

Upon impacting the microchannel plate input surface 7, a triton or alpha particle, the two fragments created when the lithium-6 fissioned, will kinetically drive electrons off their atom location and start an avalanche cascade of electrons through the microchannels in plates 3 and 5 driven by the externally applied electric field 27. The cascade of electrons generates an electron pulse that goes to ground through a resistor 12. A photomultiplier operates similarly. The pulse, being a very short electronic event, passes through the DC blanking capacitor 28 shown in FIG. 1.

An amplifier 21, as shown in FIG. 2, amplifies the electron pulse at a very fast rate into a signal which can be processed. An amplifier such as Model ZHL-6A supplied by Mini-Circuits can amplify the small nanosecond duration pulse of current as seen in the test results shown in FIG. 3 demonstrating an embodiment of the present invention. The amplified signal when observed with an oscilloscope shows a bipolar signal of a nominal one nanosecond duration (one billionth of a second) full width half height. See reference 9.

A counter 23, as shown in FIG. 2, is set with positive and negative thresholds which advances the counter when a neutron event is detected. A Model SR 400 Two Channel Gated Photon Counter supplied by Stanford Research was used to demonstrate an embodiment of the present invention. An accumulation of counts is made for a period of time and the result recorded. The counters are reset to zero and accumulation begins again. A personal computer 25 connected to counter 23 by a RS-232 connection can be used to record data generated by counter 23.

Figure 3:
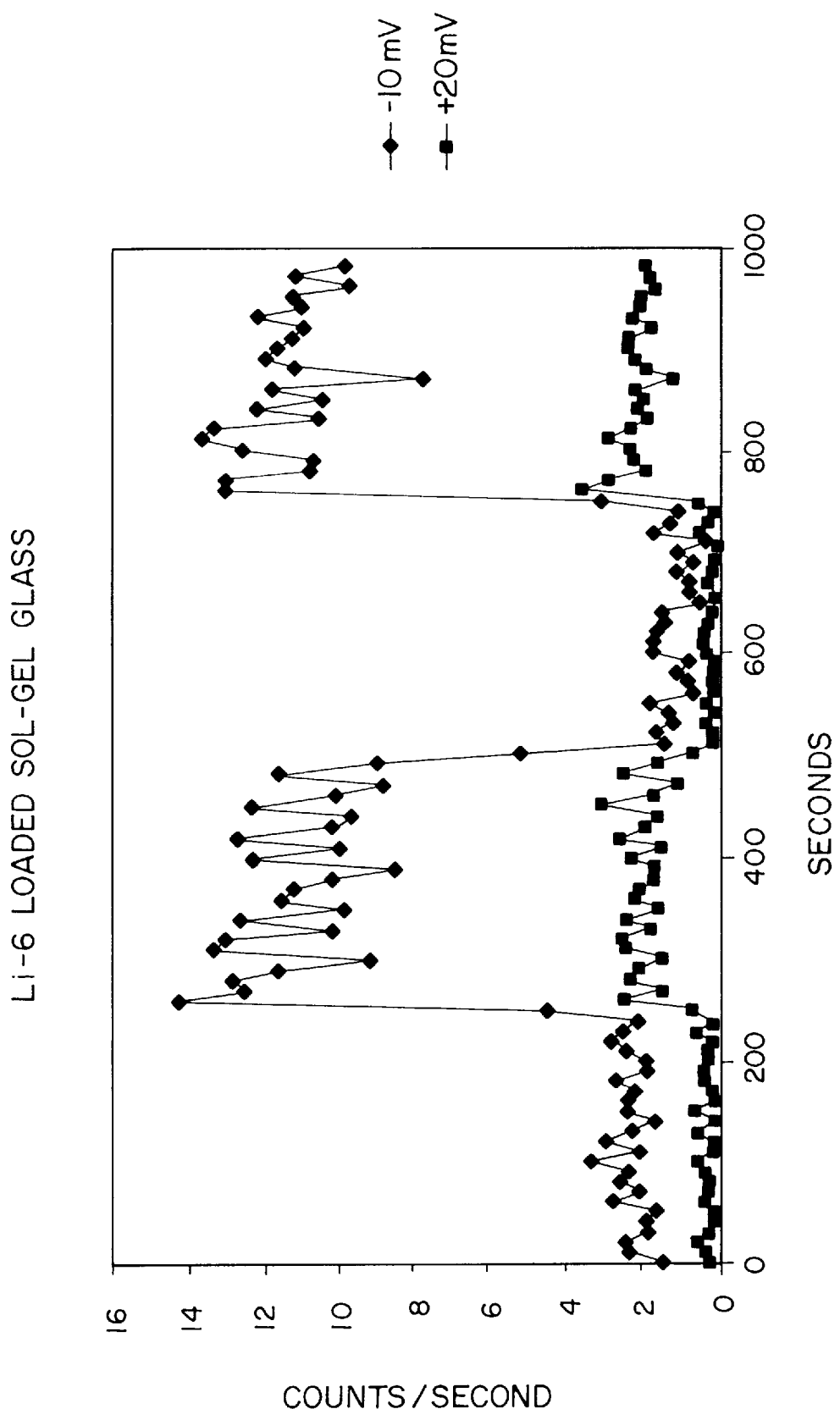
FIG. 3 is test results showing the output signal from an embodiment of the present invention when exposed to a neutron source for a specific time period.

The embodiment of the present invention as described herein and represented as detector 19 in FIGS. 1 and 2 registers the presence of neutrons as shown in FIG. 3. FIG. 3 shows that a few stray neutrons are detected by the detector 19 and are seen as a background when door 17 is closed. When door 17 is opened and detector 19 is placed into cavity 15 at approximately 225 seconds and 675 seconds, counter 23 registers a significant increase of fissioned particles as shown by FIG. 3. When detector 19 is removed from cavity 15 and door 17 is closed at approximately 500 seconds, FIG. 3 shows a dramatic decrease in detected fissioned material back to the level of background readings.

Figure 4:
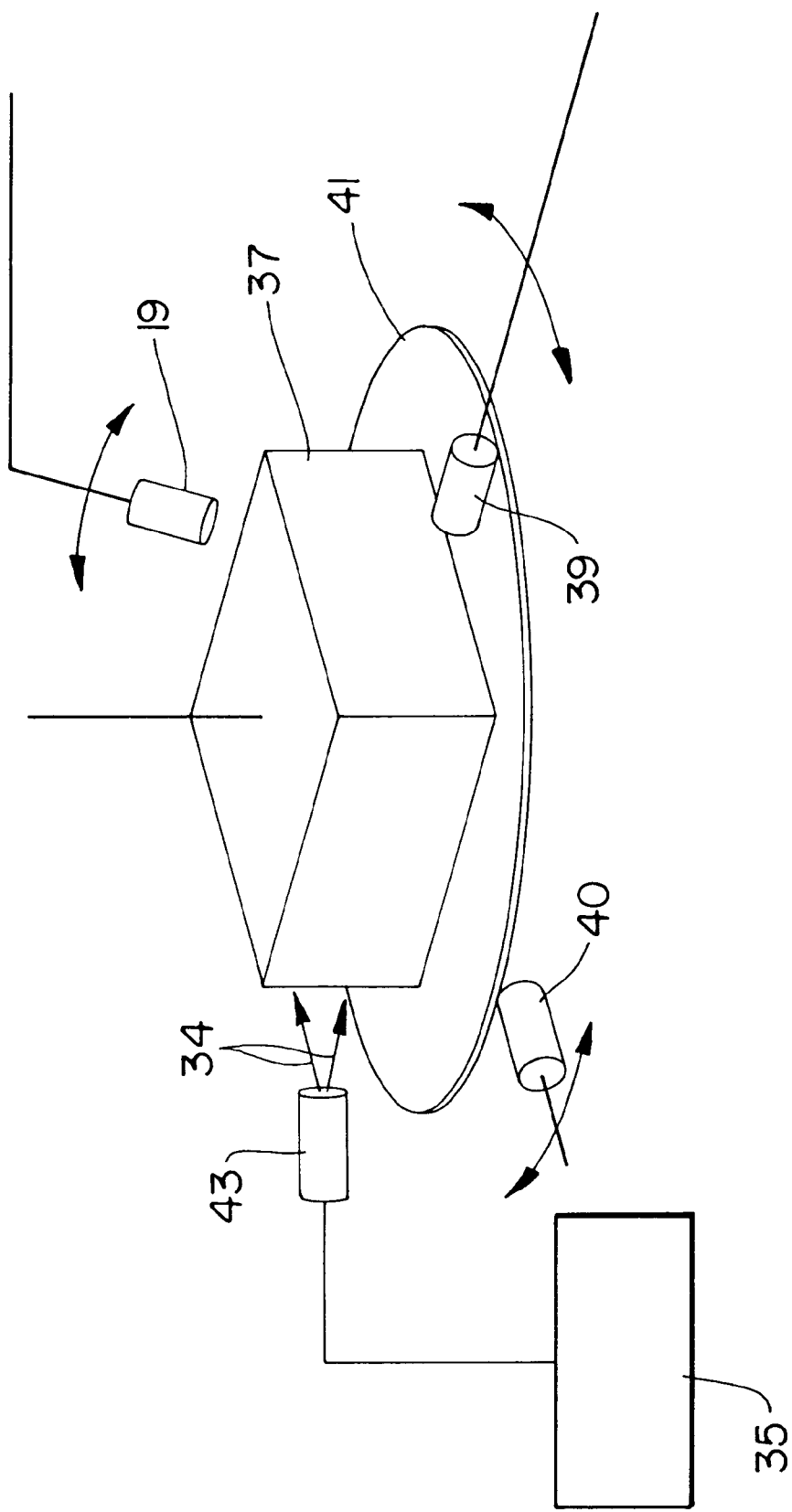
FIG. 4 is a diagram of multiple embodiments of the present invention combined with a pulsed neutron source.

A further embodiment of the present invention, as shown in FIG. 4, incorporates pulsed neutron source created by a neutron source 43 powered by a pulsed power supply 35 and an array of neutron detectors, 19, 39, and 40, each neutron detector having a different fissile material incorporated in the sol-gel absorber. Using a pulsed neutron generator in combination with a plurality of neutron detectors can provide information as to the type of fissile material being detected within a test article 37. For example enriched uranium or plutonium or a combination of the two can be detected using an embodiment of the invention as disclosed herein.

The neutron source 43 and neutron detectors, 19, 39, and, 40 can be moved relative to test article 37 in order to obtain a profile of article 37. Alternatively, as shown in FIG. 4, test article 37 is placed on a rotational/translation table 41 that allows test article 37 to be moved relative to the neutron detection system.

The material making up test article 37 affects the fast neutron burst from neutron source 43 by transmission, absorption, and scattering of the pulsed neutrons. Each of the fissile elements used in the sol-gel has its own unique cross-section. Replacing a detector at a given position with one of a differing fissile element will result in a different count profile in time. Plutonium-239 has a resonance for capturing neutrons which uranium-235 does not have. As a result there will be counts from the scattered neutron from the test object which will be present earlier in the time profile from the plutonium-239 detector. U.S. Pat. No. 3,222,521 to Einfeld issued Dec. 7, 1965 discloses a method using this difference in absorption to determine plutonium in fuel rods. See reference 4.

Microchannel plates and channeltron detectors are gated devices in that they function only when a voltage is supplied allowing the multiplication of an electron. As a result, these devices can be gated off during the large pulse from the neutron generator. After the large pulse has emitted fast neutrons into space, the detector—sol-gel system is gated on. Due to the very short period, i.e. nanoseconds, that a signal is processed into a counter using a microchannel plate or channeltron, a very high fidelity response signature from secondary neutrons can be detected. Secondary neutrons that are fast, thermal, or both can be detected in this manner using a combination of a Np-237 and a U-235 or gadolinium (Gd) doped oxide sol-gel absorber. Gadolinium does not fission, but the element does yield a prompt electron when it absorbs a neutron.

The very fast pulses which occur when a neutron is captured and a charged particle leaves the glass absorber and impacts the microchannel plate allows the neutrons from a pulsed source to be followed in very narrow windows of time. If neutrons were evenly spaced in time, up to 1000 could be counted with pulses of one nanosecond. Unfortunately, this is not the way neutrons are distributed in time. Following the time dynamics of the neutrons generated from a fast pulsed source as they interact with test articles, however, yields extremely useful information about the test object.

Information about the elemental composition of the test object can be obtained by moving the detector so that the scattered neutrons are observed. For example, as was disclosed herein, the presence of hydrogen will result in a thermalization of the incoming fast neutrons from the pulsed source. The practical information obtained by evaluating hydrogen content in metallic samples using a reactor source of neutrons for tomographic imaging is described in reference 5.

In the embodiment shown in FIG. 4, a sealed tube neutron source 43 containing deuterium or a combination of deuterium and titanium electrically connected to a pulsed power supply 35 such that bursts of 2.5 MeV or 14.3 MeV neutrons 34 are generated on a pulse of several microseconds is placed such that the pulsed neutrons strike test article 37. For additional reading on neutron sources see reference 8. A plurality of detectors, 19, 39, and 40, having differing fissionable elements and which can be moved relative to test article 37 and pulsed neutron generator created by pulsed power source 35 and neutron source 43 are located around test article 37 to detect transmitted and scattered neutrons from article 37. A pulsed neutron source, such as a neutron generator commercially available from MF Physics Corporation, Colorado Springs, Colo., can be used with the present invention.

For 14 MeV neutrons, the work of Logan and Komoto disclosed in reference 6 provides an analytic expression for the neutron removal cross sections derived from data taken on 16 elements. When this work is added to a Monte Carlo neutron transport code, experimental determinations can be made of the expected response in the detectors from the object. A computer code such as TART96, written at the Lawrence Livermore National Laboratory and available from the Radiation Safety Information Computational Center at the Oak Ridge National Laboratory is available on CD-ROM for making such modeling calculations on personal computers widely available at retailers.

A significant interest exists in locating hydrogen as a corrosion product in the aluminum structure of aging aircraft as an example of the use of this invention. In addition, water infiltration into advanced composite aircraft structural components can be examined using an embodiment of the present invention.

In addition, the interaction of the neutrons with test objects affects the time profile of the neutrons observed by the detector with a profile of narrow counting windows. If, for instance, 2000 measurements were recorded of one microsecond windows, then two milliseconds of the scattered neutrons from a test object would be recorded. By making many such measurements as the object is rotated, a profile can be made which will show existing material variations in the axis of symmetry of the object.

Another embodiment of the invention allows the observation of photoneutrons by substituting the pulsed neutron source created by pulsed power source 35 and neutron source 43, as in FIG. 4, with an x-ray machine. When high energy x-rays from a 20 MeV Microtron, Scandatronix, interact with dense material, photoneutrons are generated. The intense output of 9000 rad/minute from the x-ray generator provides sufficient photoneutrons that diagnostically useful information can be taken while conventional x-ray imaging is being made. The x-ray pulses are about four microseconds long and repeat 60 pulses per second.

Photoneutron generation in fissile material results in delayed neutrons when fissioning occurs from the photoneutrons generating fission products. Prompt detection of emitted particles using counting pulses of nominal one nanosecond duration enables the acquisition of high resolution temporal profiles from the interaction of the external pulsed source and a test article. The fast temporal profiles of the invention allow these secondary neutrons to be measured in between the high energy x-ray bursts.

Pulsed neutron inspection or photoneutron inspection provides a nondestructive determination of variation in response to the neutron stimuli. By observing the dynamic profile of neutrons coming from a test object in between the high energy x-ray bursts, significant information is obtained which complements that obtained from the x-ray film image.

A further embodiment, is very useful when an x-ray machine that has an output energy greater than 9 MeV is available. By interposing beryllium between the x-ray machine and the test article, fast neutrons are emitted by the beryllium when bombarded by x-rays from the x-ray machine. These fast neutrons may then be detected as described herein. This particular embodiment is less expensive than providing a pulsed neutron source as in FIG. 4.

In still another embodiment, UV emissions are enhanced. A new technology as described herein has been developed utilizing multichannel plates for detecting UV and particle emissions. By including within the sol-gel process a rare earth element, such as an additive of cerium oxide allowing the cerium +3 ion to be a part of the glass, UV will be generated in the glass. Other phosphors, exclusive of rare earth elements can be incorporated into the sol gel absorber. Such phosphors may be used to waveshift the output from the transparent glass absorber to better match the detector members sensitivity range.

A further embodiment of the present invention includes a sol-gel coated glass fiber containing a rare earth activator, such as europium. Particles entering the fiber excites the fluor and an optical emission results which can be detected by a fast avalanche photodiode. The emission could also be directed to the face of a microchannel plate as is described herein for direct detection of emitted particles.

In still another embodiment, the output of the microchannel plate can be directed to a thin phosphor plate interposed between plate output surface 8 and a anode 31 in FIG. 1. By using a transparent anode with a transparent conductive coating, a small camera of the miniature CCD, CID, or the like variety disposed below the transparent anode can record an image of where the neutrons were being absorbed in the sol-gel absorber. The imaging of the location of the neutrons could be used for identifying the optimal location for the detector in its intended use.

As described in reference 7, placing multichannel plates on both sides of an absorber lowers false counts. Therefore, still another embodiment of the invention is to interpose a very thin sol gel absorber between opposing particle detectors, such as microchannel plates, such that opposing particles from the fission can impinge on the particle detectors. Pulses would need to be registered from both particle detectors simultaneously to be acceptable. Commercial instruments are available for making such measurements and have been described herein.

While there has been shown and described what are at present considered the preferred embodiment of the invention, it will be obvious to those skilled in the art that various changes and modifications can be made therein without departing from the scope of the invention defined by the appended claims.

We claim:

1. A neutron detector comprising:
   a material that yields a prompt electron, proton, triton, or fission fragment when said material absorbs a neutron, said material incorporated in a sol-gel glass medium; and
   a detection member for detecting said electron, proton, triton, or fission fragment of said material.

2. A neutron detector as in claim 1 wherein said material is deposited on an essentially rigid element.

3. A neutron detector as in claim 1 wherein said material is fissionable.

4. A neutron detector as in claim 1 wherein said material contains an element selected from the group consisting of Li-6, U-234, U-235, U-236, U-238, Np-237, Pu-238, Pu-239, Pu-240, Th-232, and Gd.

5. A neutron detector as in claim 1 wherein said material is a metallic ion.

6. A neutron detector as in claim 5 wherein said metallic ion is contained within a metallic compound selected from the group of fissile metals consisting of lithium, uranium, thorium, plutonium, and neptunium.

7. A neutron detector as in claim 2 wherein said essentially rigid element is selected from the group consisting of a quartz plate, a metal plate, a glass lens, and a glass fiber.

8. A neutron detector as in claim 1 wherein said detection member is selected from the group consisting of microchannel plates, a channeltron, and an avalanche photodiode.

9. A neutron detector as in claim 1 further comprising a rare earth element included within said glass medium.

10. A neutron detector as in claim 9 wherein said rare earth element is selected from the group consisting of cerium and europium.

11. A neutron detector as in claim 1 further comprising a phosphor included within said glass medium.

12. A neutron detector as in claim 2 wherein said essentially rigid element is a glass fiber containing a rare earth element.

13. A neutron detector as in claim 12 wherein said rare earth element is selected from the group consisting of cerium and europium.

14. A neutron detector as in claim 1 wherein said detection member is a pair of detection members, wherein said material in said sol-gel glass medium is interposed between said pair of detection members.

15. A neutron detector as in claim 1 further comprising:
   a phosphor plate electrically connected to said detection member;
   a camera disposed below said phosphor plate for recording said neutron striking said material in said sol-gel glass medium.

16. A neutron detector system comprising:
   a plurality of neutron detectors, said neutron detectors having a material that yields a prompt electron, proton, triton, or fission fragment when said material absorbs a neutron, said material incorporated in a sol-gel glass medium and a detection member for detecting said electron, proton, triton, or fission fragment of said material, each of said plurality of neutron detectors having a said material different from each of said other neutron detectors; and
   a pulsed neutron source, emitting neutrons through a test article toward said neutron detectors.

17. A neutron detection system as in claim 16 wherein said pulsed neutron source emits neutron pulses of a nominal few microsecond duration.

18. A neutron detection system as in claim 16 wherein said test article and said neutron detection system are movable with respect to each other.

19. A neutron detector system comprising:
   a plurality of neutron detectors, said neutron detectors having a material that yields a prompt electron, proton, triton, or fission fragment when said material absorbs a neutron, said material incorporated in a sol-gel glass medium and a detection member for detecting said electron, proton, triton, or fission fragment of said material, each of said plurality of neutron detectors having a said material different from each of said other neutron detectors; and
   an x-ray machine emitting x-rays directed at a test article and capable of generating photoneutrons in said test article for detection by at least one of said neutron detectors.

20. A neutron detection system as in claim 19 wherein beryllium is interposed between said x-ray machine and said test article, said x-ray machine can produce x-rays at a level of at least 9 MeV.

* * * * *